Figure 1:
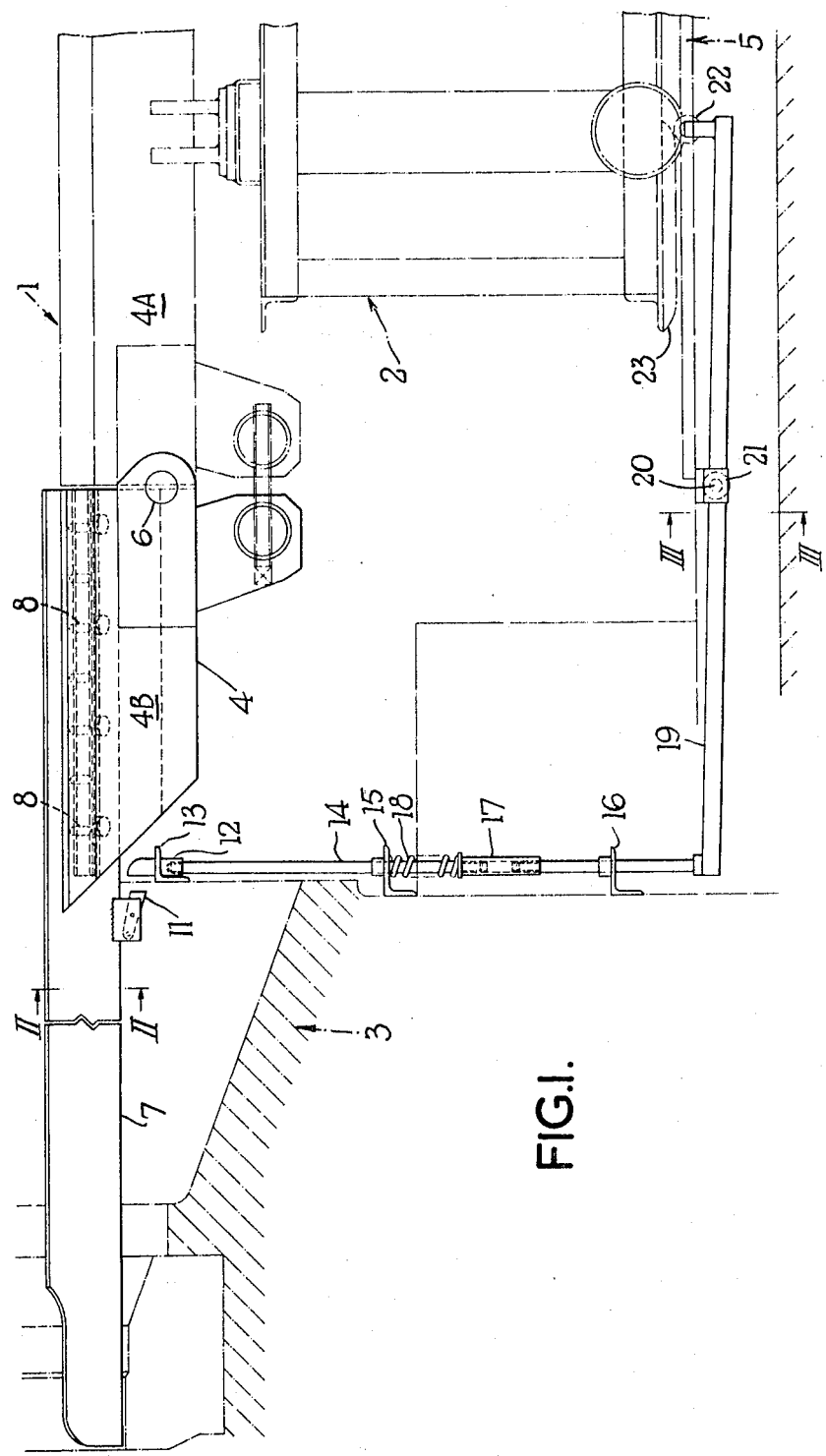

United States Patent

Kennedy et al.

[15] 3,667,273
[45] June 6, 1972

[54] RUN-OUT TROUGHS FOR EXTRUSION PRESSES

[72] Inventors: Oswald Kennedy; John Ian Harrison, both of Newcastle upon Tyne, England

[73] Assignee: Vickers Limited, London, England

[22] Filed: Dec. 23, 1969

[21] Appl. No.: 887,641

[30] Foreign Application Priority Data

Dec. 23, 1968   Great Britain......................61,162/68

[52] U.S. Cl.................................................72/257, 72/426
[51] Int. Cl......................................B21c 35/00, B21d 45/00
[58] Field of Search...........................72/257, 422, 420, 426

[56] References Cited

UNITED STATES PATENTS 2,379,622   7/1945   Butler........................................72/257
2,830,700   4/1958   Karnena...................................72/422

Primary Examiner—Charles W. Lanham
Assistant Examiner—R. M. Rogers
Attorney—Waters, Roditi, Schwartz & Nissen

[57] ABSTRACT

A run-out trough for an extrustion press, the trough having an extendable portion that can be moved from a retracted position to an extended position in which it effectively lengthens the extruded material supporting surface of the trough, the run-out trough being adapted for co-operation with an extrusion press such that upon movement of the run-out trough, with the extendable portion initially in its retracted position, to carry an extrusion away from the press, the extendable portion moves to its extended position thereby to support that end portion of the extrusion that is the last part of the extrusion to be extruded.

5 Claims, 4 Drawing Figures

RUN-OUT TROUGHS FOR EXTRUSION PRESSES

This invention relates to run-out troughs for extrusion presses.

It is conventional to provide for an extrusion press a retractable run-out trough which, during the extrusion stroke of the press, is positioned adjacent the press in a position to receive and support the extruded length of material. When the extrusion stroke has been completed and the discard parted off, the run-out trough is retracted, carrying the extrusion away from the press, usually to a traverse table where the extrusion can cool before being handled.

Owing to the thickness of the press frame necessary to hold the extrusion die and absorb the axial loads during extrusion, the run-out trough can not normally be moved close enough to the die outlet to be able to support the last portion of the extrusion. Consequently, when the trough is retracted, this last portion of the extrusion tends to droop due to its own weight and its plastic state. If this is allowed to happen, it is difficult to make the extrusion run across the traverse table. Normally, the end of the extrusion has to be manually supported while the run-out trough is retracted and until the extrusion is moved on to the traverse table.

According to the present invention there is provided a run-out trough for an extrusion press, the trough having an extendable portion that can be moved from a retracted position to an extended position in which it effectively lengthens the extruded material supporting surface of the trough, the run-out trough being adapted for co-operation with an extrusion press such that upon movement of the run-out trough, with the extendable portion initially in its retracted position, to carry an extrusion away from the press, the extendable portion moves to its extended position thereby to support that end portion of the extrusion that is the last part of the extrusion to be extruded.

Figure 2:
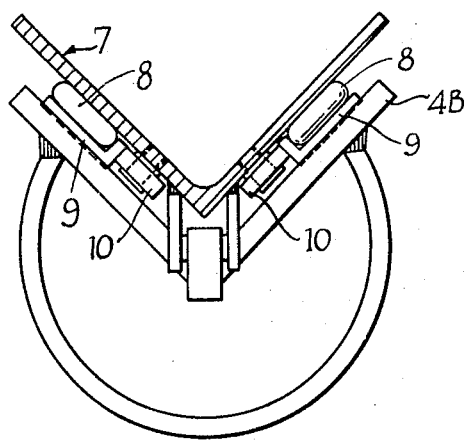
Figure 3:
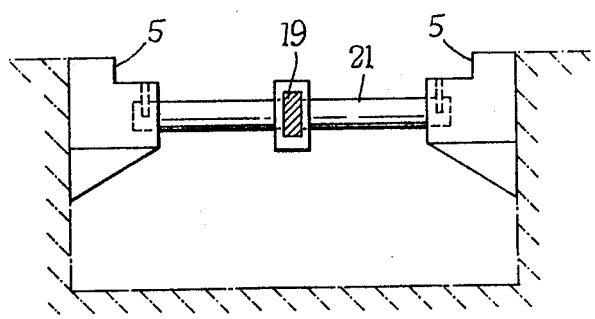
Figure 4:
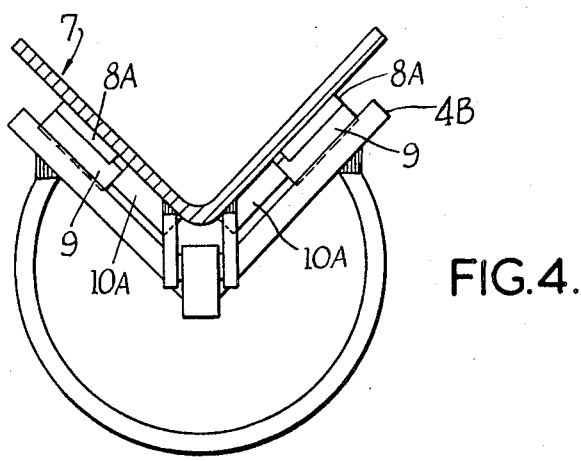

For a better understanding of the invention and to show how the same may be carried into effect, reference will now be made, by way of example, to the accompanying drawings, in which:

FIG. 1 is a diagrammatic side view of a run-out trough, a carriage supporting the trough, and part of an extrusion press with which the trough co-operates, FIG. 2 is a sectional view of the trough of FIG. 1 taken on the line II—II of FIG. 1, FIG. 3 is a sectional view of mechanism associated with the carriage of FIG. 1, taken on the line III—III of FIG. 1, and FIG. 4 is a view similar to FIG. 2 of a modified form of trough.

The run-out trough 1 shown, in FIG. 1, mounted on the carriage 2 for co-operation with the extrusion press 3 includes a main V-sectioned trough portion 4 composed of two parts 4A and 4B. The main part 4A is mounted on the carriage 2 which runs on rails 5 aligned with the press 3 so that the trough can be moved into a position adjacent the press to receive and support a length of material extruded from the press, and retracted from the press to carry the extrusion away from the press. The part 4B extends forwardly (with respect to the direction of operative movement of the trough towards the press) from the part 4A, it being attached to the part 4A by a hinge 6 that allows vertical adjustment of the forward end of the run-out trough.

The trough part 4B carries an extendable portion 7 of the trough 1, this portion 7 being of V-section conforming to the section of the portion 4 and being slidably supported by the trough part 4B so as to be movable axially of the trough part 4B from a retracted position in which a proportion of its length is disposed within the main portion 4 of the trough to an extended position (in which it is shown in FIG. 1) in which it effectively lengthens the extruded material supporting surface of the trough as compared with the overall length of this surface when the portion 7 is in its retracted position. The portion 7 is supported in the part 4B by a row of linear bearings 8 carried by each side of the part 4B, each row of bearings 8 being mounted in a support member 9 that also serves as a guide for roller bearings 10 carried by the portion 7.

The portion 7 carries a pivotable latch 11 forming a part of a coupling and which co-operates with a bolt 12 forming a further part of the coupling and which is slidably mounted for up and down movement in a bracket 13 carried by the press 3. The bolt 12 is at the upper end of an upright, two-part, push rod 14 that is slidably supported by further brackets 15 and 16 also carried by the press 3. The two parts of the push rod 14 are interconnected by a turnbuckle 17 that can be utilized to alter the overall length of the push rod, and the push rod is urged downwardly into a position in which the bolt 12 is clear of the latch 11 by a compression spring 18 acting between the bracket 15 and the turnbuckle 17.

The lower end of the push rod 14 is engaged with one end of a lever arm 19 that is mounted between the carriage guide rails 5 for pivoting about a point 20 near its center, the arm 19 being mounted on a shaft 21 extending between the rails 5 (see FIG. 3). At its end remote from the push rod 14, the lever arm 19 carries a roller 22 that is disposed for engagement by an elongated cam 23 carried by the carriage.

The run-out trough 1 and associated mechanism described above operates as follows:

From the fully run-out position the trough 1 is moved towards the press 3 with the extendable portion 7 in its extended position. The portion 7 passes trough outer parts of the frame of the press and comes into contact with an inner part of the frame, downstream of the die outlet hole (not shown) through which the extrusion will pass. The portion 7 is prevented, by its contact with the press, from further forward movement and therefore slides over the still moving main portion 4 of the run-out trough. During the movement of the run-out trough 1 towards the press 3, after the latch 11 has passed the bolt 12 (which at this stage is in its lowered position), the cam 23 on the carriage 2 engages the wheel 22 to pivot the lever arm 19 clockwise (FIG. 1), causing the push rod 14 to move upwardly and thus placing the bolt 12 in line with the latch 11. The length of the cam 23 ensures that the wheel 22 is held down, and hence the bolt 12 is retained in its uppermost position, during the continuation of the run-in of the carriage 2. Run-in of the carriage 2 is completed when the main portion 4 of the run-out trough engages the frame of the press 3 (this being the position shown in FIG. 1) and extrusion can now take place.

When the extrustion stroke has been completed and the discard has been parted off, retraction of the run-out trough 1 is commenced. Initially the extendable portion 7 is locked in position by the engagement between the latch 11 and bolt 12 and the portion 7 therefore remains stationary until the whole length of the cam 23 has passed over the roller 22. When the cam 23 has cleared the roller 22 the spring 18 asserts itself and the arm 19 pivots anti-clockwise (FIG. 1) so that the bolt 12 clears the latch 11, thereby freeing the extendable portion 7, which has now reached its extended position, to run-out with the main portion 4 of the trough. It will be understood that the distance travelled by the main portion 4 of the trough of the run-out before the extendable portion 7 is released is related to the amount by which the cam 23 overlaps the roller 22 in the fully run-in position, and that this amount of overlap is matched to the length of extrusion that is between the outlet hole and the forward end of the portion 7 on completion of the extrusion stroke. This length of extrusion is eventually supported by the extendable portion 7, in its extended position, during the final part of the run-out movement of the trough 1.

In FIG. 4 there is shown an alternative mounting for the trough portion 7, in which form the trough 7 is supported in the part 4B by bronze strips 8A that replace the linear bearings 8, and the roller bearings 10 are replaced by further bronze strips 10A.

In yet another form of mounting (not shown) for the trough portion 7, the portion 7 is guided by pins engaged in slots.

We claim:

1. A run-out trough for an extrusion press, the trough having an extendable portion that can be moved from a retracted position to an extended position in which it effectively lengthens the extruded material supporting surface of the trough, the run-out trough being adapted for co-operation with an extrusion press such that upon movement of the run out trough, with the extendable portion initially in its retracted position, to carry an extrusion away from the press, the extendable portion moves to its extended position thereby to support that end portion of the extrusion that is the last part of the extrusion to be extruded; the trough being adapted to move in a substantially horizontal direction when moving to carry an extrusion away from said press, said extendable portion of the trough being mounted on a part of a main portion of the trough for movement axially with respect to said part; and said part of said main portion being vertically adjustable with respect to a further part of said main portion.

2. A run-out trough according to claim 1, wherein said extendable portion of the trough carries a first coupling part, which first coupling part is engageable with a second coupling part carried by the press, the arrangement being such that after movement of the trough with said extendable portion retracted into position to receive an extrusion from the press the coupling parts automatically engage with one another upon subsequent movement of the run-out trough away from the press whereby said extendable portion is held by the coupling and the remainder of the run-out trough moves relative to said extendable portion.

3. A run-out trough according to claim 2, wherein the run-out trough carries coupling actuation means arranged to place said coupling parts in position for engagement upon movement of said trough into position to receive an extrusion, and automatically to release said coupling parts upon further movement of the run-out trough away from the press after said extendable portion has reached its extended position.

4. A run-out trough as claimed in claim 3, wherein said first coupling part is a latch, and wherein said second coupling part is a bolt movable from a first position in which it is clear of the path of movement of the latch to a second position in which it projects into this path, said bolt being coupled with an actuating mechanism and being resiliently urged into said first position; and wherein said coupling actuation means comprises a member carried by the run-out trough and arranged to actuate said actuating mechanism as the run-out trough reaches its extrusion-receiving position to move said bolt to said second position, and to actuate said actuating mechanism to permit said bolt to return to said first position as the run-out trough commences said further movement away from the press after said extendable portion has reached its extended position.

5. A run-out trough according to claim 4, wherein said actuating mechanism includes a pivotable lever connected with said bolt, and wherein said member constituting said coupling actuation means is a cam arranged to engage said lever to pivot the lever during movement of the run-out trough towards and away from the press.

* * * * *